Patented June 7, 1949

2,472,125

UNITED STATES PATENT OFFICE 2,472,125

PRINTING INKS

Charles A. Rietz, Park Ridge, Ill., assignor to Interchemical Corporation, New York, N. Y., a corporation of Ohio No Drawing. Application March 2, 1945,
Serial No. 580,705

2 Claims. (Cl. 260—33.2)

This invention relates to printing inks which can be set or dried by the application of water thereto, and aims to provide an ink of this type, characterized by improved press-stability and printing properties and toughness of film, as compared with previously known inks of the same type.

Inks which may be dried by the application of water upon the freshly printed film and methods of printing with such inks are disclosed and claimed in Gessler et al. Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid.

Various methods have been suggested to overcome this problem, among others the use of rosin modified by the diene addition of maleic or fumaric acid (U. S. Patent No. 2,244,103, June 3, 1941). While these improved inks are less susceptible to precipitation difficulties in humid weather, they leave much to be desired in printability. In particular, the flow of the inks and the wetting properties of such vehicles are apt to be poor, resulting in poor impressions from halftones.

I have discovered that improved inks of this type can be obtained by using as the vehicle water-soluble solvents selected from the group consisting of polyglycols and water-soluble derivatives thereof, having dissolved therein as binder resins formed by reactions of terpenes or terpineols with a phenolic body, such as are described in U. S. Patents Nos. 1,469,709 and 2,040,812.

Typical examples of the invention are the following:

Example 1

| | Parts |
|---|---|
| Diglycol (crude diethylene glycol) | 14 |
| Varnish, composed of 42 parts terpene phenolic resin of U. S. Patent No. 2,040,812 (Durez 12,656), 58 parts diglycol | 33 |
| Calcium lithol red (red shade) | 3 |
| Barium lithol red (orange shade) | 4.5 |
| Blanc fixe | 12.0 |

Example 2

| | Parts |
|---|---|
| Calcium lithol red | 20 |
| Varnish of Example 1 | 70 |
| Diglycol | 10 |

Example 3

A resin was made by reacting 100 parts resorcinol, 100 parts alpha terpineol, 10 parts an acid catalyst such as phosphoric acid at 100° C. The resin was dehydrated at 90° C., under vacuum, washed free of catalyst, heated at 200° C., and dumped. A varnish was made from 200 parts by weight of this resin and 125 parts by weight of dipropylene glycol, by melting together at 120° C. An ink was made by grinding 54 parts by weight of barium lithol red with 168 parts by weight of the varnish, and 33 parts by weight of diglycol. The ink had unusually good body, printed well at fairly high relative humidities, and moisture-set very readily.

Example 4

A resin was made by reacting 100 parts resorcinol, 100 parts Allo-ocimene, and 10 parts a catalyst, at 75° C. It was dehydrated, washed and then milled to 250° C. The overall reaction time was 8 hours.

This resin was made up into a varnish and a finished ink in exactly the same fashion as the resin of Example 3. This ink was slightly less stable at high humidity, and gave very satisfactory water-setting.

Examples can of course be multiplied indefinitely without departing from the scope of the invention as defined in the claims. In particular, other water-soluble polyglycols (e. g. dipropylene glycol, tetraethylene glycol, etc.) and their water-soluble mono-ethers, can be used to replace the diethylene glycol.

I claim:

1. A typographic printing ink characterized by its ability to be set by the addition of water to the film and by its improved printing characteristics, which comprises pigment dispersed in a vehicle the essential binder of which is a resin comprising the condensation product of a phenol and a compound selected from the class consisting of terpene and terpineols which is soluble in a polyglycol, the resin being dissolved in a solvent of the group consisting of water-soluble polyglycols and the water-soluble monoethers thereof.

2. A typographic printing ink characterized by its ability to be set by the addition of water to the film and by its improved printing characteristics, which comprises pigment dispersed in a vehicle the essential binder of which is a resin comprising the condensation product of terpineol and a phenol which is soluble in a polyglycol, the resin being dissolved in a solvent of the group consisting of water-soluble polyglycols and the water soluble monoethers thereof.

CHARLES A. RIETZ.

REFERENCES CITED

The following references are of record in the file of this patent:

UNITED STATES PATENTS

| Number | Name | Date |
|---|---|---|
| 2,327,594 | Erickson et al. | Aug. 24, 1943 |

FOREIGN PATENTS

| Number | Country | Date |
|---|---|---|
| 474,465 | Great Britain | Nov. 2, 1937 |